(12) United States Patent
Yeou et al.

(10) Patent No.: US 9,178,198 B2
(45) Date of Patent: Nov. 3, 2015

(54) SEPARATOR FOR RECHARGEABLE LITHIUM BATTERY AND RECHARGEABLE LITHIUM BATTERY INCLUDING THE SAME

(75) Inventors: Jung-Ock Yeou, Yongin-si (KR); Ihn Kim, Yongin-si (KR); Sam-Jin Park, Yongin-si (KR); Kwi-Seok Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/598,165

(22) Filed: Aug. 29, 2012

(65) Prior Publication Data
US 2013/0323569 A1 Dec. 5, 2013

Related U.S. Application Data

(60) Provisional application No. 61/654,780, filed on Jun. 1, 2012.

(51) Int. Cl.
| | |
|---|---|
| *H01M 2/16* | (2006.01) |
| *H01M 2/14* | (2006.01) |
| *H01M 10/052* | (2010.01) |
| *H01M 10/0587* | (2010.01) |

(52) U.S. Cl.
CPC ............ *H01M 2/145* (2013.01); *H01M 2/1653* (2013.01); *H01M 2/1686* (2013.01); *H01M 10/052* (2013.01); *H01M 10/0587* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 5,091,272 | A * | 2/1992 | Treger | 429/62 |
| 6,322,923 | B1 | 11/2001 | Spotnitz et al. | |
| 6,548,590 | B1 * | 4/2003 | Koloski et al. | 524/492 |
| 7,638,241 | B2 | 12/2009 | Lee et al. | |
| 2002/0172870 | A1 * | 11/2002 | Urairi et al. | 429/249 |
| 2004/0034154 | A1 * | 2/2004 | Tutin et al. | 524/538 |
| 2006/0275661 | A1 * | 12/2006 | Kim et al. | 429/217 |
| 2008/0292968 | A1 * | 11/2008 | Lee et al. | 429/247 |
| 2011/0027658 | A1 * | 2/2011 | Kim et al. | 429/247 |
| 2011/0081601 | A1 * | 4/2011 | Weber et al. | 429/494 |
| 2011/0229768 | A1 | 9/2011 | Pan et al. | |

FOREIGN PATENT DOCUMENTS

| | | |
|---|---|---|
| EP | 2 485 302 A1 | 8/2012 |
| JP | 2008-234879 | 10/2008 |
| JP | 2010-146839 | 7/2010 |

(Continued)

OTHER PUBLICATIONS

Full English Machine Translation of JP 2008-234879, 14 pages.
(Continued)

*Primary Examiner* — Patrick Ryan
*Assistant Examiner* — Haixia Zhang
(74) *Attorney, Agent, or Firm* — Christie, Parker & Hale, LLP

(57) ABSTRACT

A separator for a rechargeable lithium battery includes a porous substrate; and a coating layer disposed on one or more sides of the porous substrate, the coating layer including organic particles and a binder polymer, wherein the organic particles include a material different from that of the binder polymer and the binder polymer is included in the coating layer in an amount in a range of 50 to 99 wt % based on the total amount of the coating layer, and a rechargeable lithium battery including the same.

17 Claims, 1 Drawing Sheet

(56) References Cited

FOREIGN PATENT DOCUMENTS

| | | |
|---|---|---|
| JP | 2010238448 A * | 10/2010 |
| JP | 2011-134584 | 7/2011 |
| KR | 1999-0066849 | 8/1999 |
| KR | 10-0727247 | 6/2007 |
| WO | WO 2011/040474 A1 | 4/2011 |
| WO | WO 2012/019626 A1 | 2/2012 |

OTHER PUBLICATIONS

Full English Machine Translation of JP 2010-146839, 15 pages.
Full English Machine Translation of JP 2011-134584, 12 pages.
European Search Report dated Jan. 28, 2013, for corresponding Euroepan Patent application 12186150.4, (8 pages).

* cited by examiner

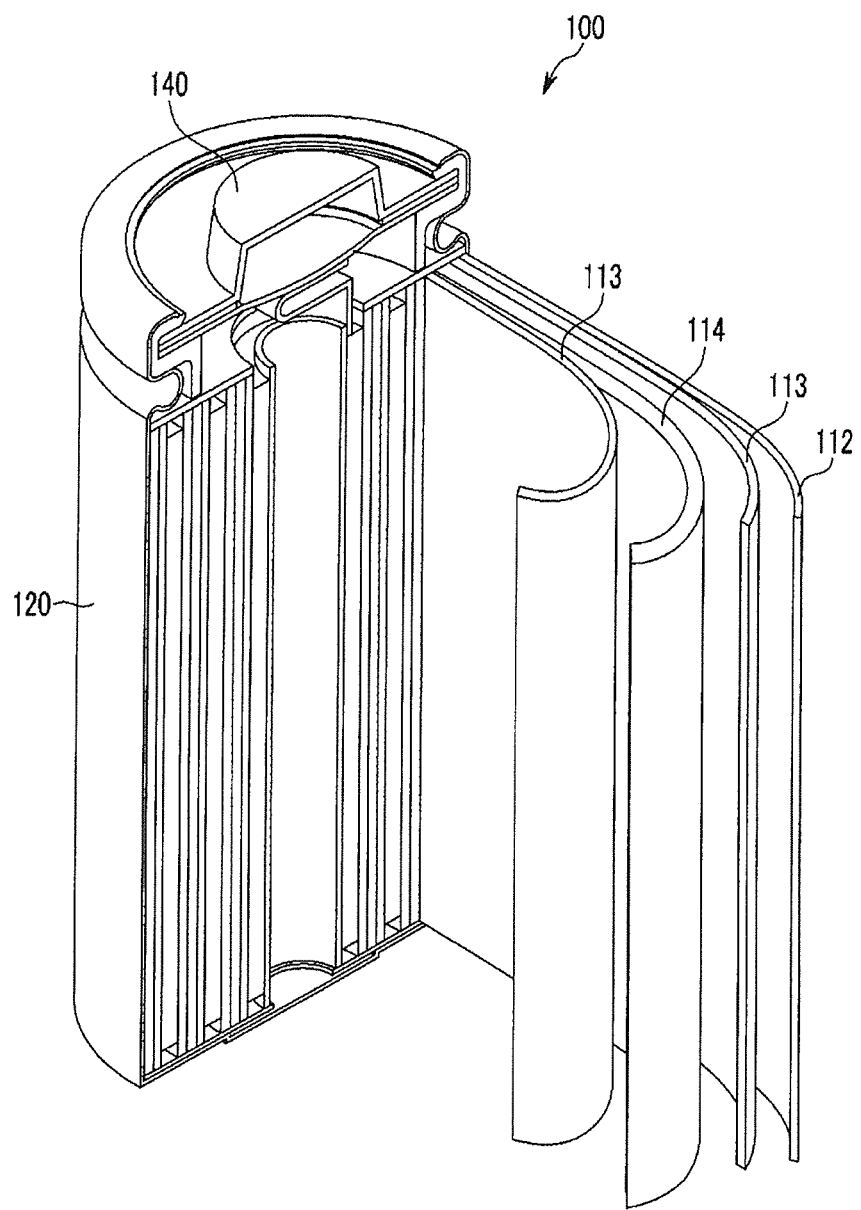

SEPARATOR FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of U.S. Provisional Application No. 61/654,780, filed on Jun. 1, 2012, in the U.S. Patent and Trademark Office, the entire content of which is incorporated herein by reference.

BACKGROUND

1. Field

This disclosure relates to a separator for a rechargeable lithium battery and a rechargeable lithium battery including the same.

2. Description of the Related Art

A conventional rechargeable lithium battery includes a separator made of a porous insulating film interposed between positive and negative electrodes. The pores of the film are impregnated by an electrolyte solution including a lithium salt dissolved therein. The non-aqueous rechargeable lithium battery has excellent high-capacity and high energy density characteristics.

However, when the positive and negative electrodes therein are repetitively contracted and expanded during the charge and discharge cycles, they may react with a separator or an electrolyte solution. As a result, the non-aqueous rechargeable lithium battery may be easily deteriorated, have internal and external short circuits, and rapidly become hot. When the battery rapidly becomes hot as aforementioned, the separator is fused and is then rapidly contracted or destroyed and thus, short-circuited again.

In order to prevent (or reduce) this problem, a conventional separator is widely formed of a porous polyethylene film having excellent shutdown characteristic, is easily handled, and has low cost. Herein, the shutdown indicates that a separator is partly fused, which closes the pores and cuts off the current when the battery is heated up due to overcharge, external or internal short circuit, and the like.

In addition, an attempt has been made to improve safety of the rechargeable lithium battery by improving heat resistance of the electrode material for the separator and the like and in particular, to secure safety even when the separator therein is sharply contracted or destroyed.

SUMMARY

An aspect of an embodiment of the present invention is directed toward a separator for a rechargeable lithium battery having improved safety when used in a battery due to excellent heat resistance.

Another aspect of an embodiment of the present invention is directed toward a rechargeable lithium battery including the separator for a rechargeable lithium battery.

One embodiment provides a separator for a rechargeable lithium battery that includes a porous substrate; and a coating layer on one or more sides of the porous substrate, the coating layer including organic particles and a binder polymer, wherein the organic particles include a material different from that of the binder polymer, and the binder polymer is included in the coating layer in an amount in a range of 50 to 99 wt % based on the total amount of the coating layer.

The organic particles may have an average particle diameter in a range of 1 nm to 1000 nm.

The organic particles may include an organic compound selected from the group consisting of acrylate-based compounds, derivatives of acrylate-based compounds, diallyl phthalate-based compounds, derivatives of diallyl phthalate-based compounds, polyimide-based compounds, derivatives of polyimide-based compounds, copolymers thereof, and mixtures thereof.

The organic particles may be continuously or discontinuously positioned on the surface of the binder polymer.

The binder polymer may include a polymer polymerized from a monomer selected from the group consisting of ethylenic unsaturated carboxylic acid alkyl esters, nitrile-based compounds, conjugated diene-based compounds, ethylenic unsaturated carboxylic acids, salts of ethylenic unsaturated carboxylic acids, aromatic vinyl compounds, fluoroalkylvinylethers, vinylpyridines, non-conjugated diene-based compounds, α-olefins, ethylenic unsaturated amide compounds, sulfonic acid-based unsaturated compounds, and mixtures thereof.

The binder polymer may further include another polymer polymerized from another monomer including a functional group selected from hydroxyl groups, glycidyl groups, amino groups, N-methylol groups, and vinyl groups.

The binder polymer may be formed from an emulsion including binder polymer particles dispersed therein, and the binder polymer particles may have an average particle diameter of 0.01 μm to 0.5 μm.

The binder polymer may be included in the coating layer in an amount in a range of 80 to 99 wt % based on the total amount of the coating layer.

The coating layer may further include a binder including a silane-based compound, and the binder and the binder polymer may be different.

The silane-based compound may include a functional group selected from the group consisting of alkoxy groups, halogen groups, amino groups, vinyl groups, glycidoxy groups, and hydroxy groups.

The silane-based compound may include one selected from the group consisting of vinyl alkylalkoxysilane, epoxyalkylalkoxysilane, aminoalkylalkoxysilane, mercaptoalkylalkoxysilane, halogenated alkylalkoxysilane, vinylhalosilane, and alkylacyloxysilane.

The binder may be included in the coating layer in an amount in a range of 0.05 to 5 parts by weight based on 100 parts by weight of the binder polymer.

The porous substrate may include at least one selected from the group consisting of glass fiber, polyester, polyolefin, polytetrafluoroethylene (PTFE or, e.g., TEFLON®), and polyacrylonitrile. TEFLON® is a registered trademark of E.I. du Pont de Nemours and Company, Wilmington, Del.

Another embodiment provides a rechargeable lithium battery including a positive electrode; a negative electrode facing the positive electrode; the separator between the positive electrode and the negative electrode; and an electrolyte solution impregnating the positive electrode, the negative electrode, and the separator.

According to another embodiment, a method of forming a separator for a rechargeable lithium battery includes: preparing an emulsion including binder polymer particles; forming a binder polymer from the emulsion; mixing the binder polymer with organic particles to form a coating layer composition; and coating the coating layer composition on a porous substrate to form a coating layer comprising the organic particles and the binder polymer.

Hereinafter, further embodiments will be described in detail.

The separator having excellent heat resistance can provide a rechargeable lithium battery having improved safety and reduce a manufacturing cost of the separator.

BRIEF DESCRIPTION OF THE DRAWING

The accompanying drawing, together with the specification, illustrates an exemplary embodiment of the present invention, and, together with the description, serves to explain principles of the present invention.

Here, the accompanying drawing is a schematic view showing a rechargeable lithium battery according to one embodiment.

DETAILED DESCRIPTION

Exemplary embodiments will hereinafter be described in detail. However, these embodiments are exemplary, and this disclosure is not limited thereto. As those skilled in the art would recognize, the invention may be embodied in many different forms and should not be construed as being limited to the embodiments set forth herein. Like reference numerals designate like elements throughout the specification.

A separator for a rechargeable lithium battery according to one embodiment includes a porous substrate, and a coating layer positioned on at least one side (e.g., one or more sides) of the porous substrate.

The coating layer includes organic particles and a binder polymer, and the organic particles and the binder polymer are different material from each other (e.g., the organic particles include a material that is different from that of the binder polymer).

The organic particles may be continuously or discontinuously positioned on the surface of the binder polymer. The coating layer having the above structure can endow the separator with excellent strength and heat resistance.

The organic particles may have an average particle diameter in a range of 1 nm to 1000 nm, specifically 1 nm to 100 nm, and more specifically 1 nm to 10 nm. In one embodiment, when the organic particles have an average particle diameter within the above range, the coating layer has excellent strength and provides a separator with heat resistance.

The organic particles may be obtained from at least one organic compound selected from acrylate-based compounds, derivatives of acrylate-based compounds, diallyl phthalate-based compounds, derivatives diallyl phthalate-based compounds, polyimide-based compounds, derivatives of polyimide-based compounds, copolymers thereof, and mixtures thereof.

The organic particles may be obtained by the following methods.

In an embodiment, the acrylate-based compound is dispersed in an emulsifier, an aqueous copper sulfate solution in a small amount is added thereto, and a redox polymerization initiator is added thereto for emulsion-polymerization, thereby obtaining the organic particles.

In an embodiment, the organic particles may be obtained by polymerizing the diallyl phthalate-based compound in the presence of a water-soluble polymerization initiator.

In an embodiment, the organic particles may be obtained by reacting an emulsion particle having a core part including a hydrophobic polymer and a shell part including a hydrophilic polymer including an aldehyde-based compound. In one embodiment, the hydrophobic polymer has a glass transition temperature of greater than or equal to about 20° C. and an acetoacetyl group. The hydrophilic polymer has a functional group being capable of being dispersed in water.

In an embodiment, polyamic acid particulates are dispersed into a hydrophilic solvent and imidized by acetic anhydride, pyridine, and the like, preparing a polyimide particulate dispersion, and the hydrophilic solvent is removed through centrifugation. A surfactant aqueous solution is added to the remaining side products to substitute water, thereby obtaining organic particles.

In addition, the organic particles may include HA-DVD-500 having an average particle diameter of about 11.7 nm made by Nissan Chemical Industries Ltd., EPOSTAR® MX020W having an average particle diameter in a range of about 3 nm to about 10 nm made by Nippon Shokubai Co., Ltd., or the like or at least one of these products having a reactive functional group. EPOSTAR® is a registered trademark of Nippon Shokubai Co., Ltd.

In addition, the organic particles may have a glass transition temperature of greater than or equal to about 20° C., specifically, greater than or equal to about 50° C. and more specifically, may have enough of a highly cross-linked structure not to have a glass transition temperature.

The organic particles may be included in an amount of 1 to 50 wt %, and specifically 1 to 20 wt % based on the total amount of the coating layer, that is, the total amount of the organic particles and the binder polymer. In one embodiment, within the above amount range, heat resistance of the separator is improved and thus a rechargeable lithium battery having excellent separator characteristics is realized.

The binder polymer may improve heat resistance of the separator, provide a matrix formed on the surface of the organic particles, and react with the binder, each of which will be described below.

The binder polymer may be, but is not limited to, a polymer polymerized from a monomer including ethylenic unsaturated carboxylic acid alkyl ester such as methyl(meth)acrylic acid, ethyl(meth)acrylic acid, butyl(meth)acrylic acid, 2-ethylhexyl(meth)acrylic acid, or the like; a nitrile-based compound such as (meth)acrylonitrile, fumaronitrile, α-chloro(meth)acrylonitrile, α-cyanoethyl(meth)acrylonitrile, and the like; a conjugated diene-based compound such as 1,3-butadiene, isoprene, 2,3-dimethyl-1,3-butadiene, 2-ethyl-1,3-butadiene, 1,3-pentadiene, chloroprene, or the like; ethylenic unsaturated carboxylic acid and a salt thereof such as (meth)acrylic acid, maleic acid, fumaric acid, citraconic acid, or the like; an aromatic vinyl compound such as styrene, alkylstyrene, vinylnaphthalene, or the like; fluoroalkylvinylether such as fluoroethylvinylether, or the like; vinylpyridine; a non-conjugated diene-based compound such as vinylnorbornene, dicyclopentadiene, 1,4-hexadiene, or the like; α-olefin such as ethylene, propylene, or the like; an ethylenic unsaturated amide compound such as (meth)acrylamide, or the like; a sulfonic acid-based unsaturated compound such as acrylamide methylpropane sulfonic acid, styrene sulfonic acid, or the like.

The binder polymer may further include a polymer polymerized from another monomer having a functional group, in addition to the polymer.

The functional group of the other monomer may be a cross-linking point of the binder polymer during cross-linking, and specific examples of the functional group may include at least one selected from a hydroxyl group, glycidyl groups, amino groups, N-methylol groups, and vinyl groups, but the functional group is not limited thereto.

Specific examples of the other monomer having a functional group may include a hydroxyester compound of an ethylenic unsaturated carboxylic acid such as hydroxypropyl (meth)acrylic acid, hydroxyethyl(meth)acrylic acid, or the like; a glycidylester compound of an ethylenic unsaturated carboxylic acid such as glycidyl(meth)acrylate, or the like; an aminoester compound of an ethylenic unsaturated carboxylic acid such as dimethylaminoethyl(meth)acrylate, or the like; a methylol group—containing an ethylenic unsaturated amide compound such as N-methylol(meth)acrylamide, N-dimethylol(meth)acrylamide, or the like; and at least two vinyl groups-containing compound such as ethylene di(meth)acrylate, divinylbenzene, or the like.

The other monomer having a functional group may be used in an amount of less than or equal to 5 wt %, and specifically less than or equal to 2 wt % based on the total amount of total monomers used to obtain the binder polymer. In one embodiment, within the above range, reaction with a functional group of a binder that will be described below is carried out, and thus adherence and heat resistance of the separator may be improved.

The binder polymer may be obtained by a manufacturing method such as emulsion polymerization, solution polymerization, or the like. During polymerization, a temperature, a pressure, a method of adding a monomer, and the like, kinds of additives such as a polymerization initiator, a molecular weight-adjusting agent, an emulsifier, a pH adjusting agent, or the like are not limited specifically.

Examples of the polymerization initiator may be a water-soluble initiator such as persulfate, and the like, and an oil-soluble initiator such as benzoyl peroxide, or the like.

Examples of the molecular weight-adjusting agent may include mercaptans such as t-dodecyl mercaptan, n-dodecyl mercaptan, and the like; an α-methylstyrene dimer; sulfides such as dimethylxanthene disulfide, diisopropyl xanthene disulfide, and the like; nitrile compounds such as 2-methyl-3-butenenitrile, 3-pentenenitrile, or the like, and may be used singularly or as a mixture of two or more.

Examples of the emulsifier may include an anionic surfactant, a non-ionic surfactant, and the like, and may be used singularly or as a mixture. A reactive surfactant, a protective colloid, or the like may also be used.

The binder polymer may have a glass transition temperature in a range of −50 to 60° C., and specifically −40 to 20° C.

The binder polymer is not limited in its shape but may be in the form of emulsion including binder polymer particles dispersed therein.

The binder polymer particles dispersed in the emulsion may have an average particle diameter of 0.01 µm to 0.5 µm, specifically 0.05 µm to 0.5 µm, and more specifically 0.08 µm to 0.2 µm. In one embodiment, within the average particle diameter ranges, the emulsion has an appropriate viscosity, the separator manufactured using the binder polymer has excellent heat resistance, and a rechargeable lithium battery having excellent safety is realized.

The emulsion may have pH in a range of 7 to 10.5 to maintain stability of the emulsion.

Examples of the pH adjusting agent may include ammonia, an alkali metal hydroxide such as lithium hydroxide, sodium hydroxide, potassium hydroxide, and the like.

The emulsion may be prepared by a well-known emulsion polymerization method or a phase inversion method. The emulsion polymerization method and phase inversion method have no particular limited conditions.

The binder polymer may be included in an amount in a range of 50 to 99 wt %, and specifically 80 to 99 wt % based on the total amount of the coating layer, that is, the total amount of the organic particles and the binder polymer. In one embodiment, within the above amount range, an adherence between the separator and the coating layer is improved, heat resistance of the separator is improved to provide a rechargeable lithium battery having excellent safety.

The coating layer may further include a binder along with the organic particles and the binder polymer, the binder and the binder polymer being different.

Through the binder, the organic particles and the binder polymer may be linked (e.g., linked organically), and the coating layer including the organic particles positioned on the surface of the binder polymer may be formed. Accordingly, the separator has improved heat resistance, a surface area of the binder polymer exposed on the surface of the coating layer and adherence with an electrode may be improved.

The binder may be a silane-based compound, and the silane-based compound may be a silane coupling agent.

The silane-based compound may include at least one functional group selected from alkoxy groups, halogen groups, amino groups, vinyl groups, glycidoxy groups, and hydroxy groups.

The functional group of the silane-based compound may react with a functional group of the binder polymer.

Examples of the silane-based compound may include at least one selected from vinyl alkylalkoxysilane such as vinyltris(β-methoxyethoxy)silane, ϒ-methacryloxylpropyltrimethoxysilane, or the like; epoxyalkylalkoxysilane such as ϒ-glycidoxypropyltrimethoxysilane, β-(3,4-epoxycyclohexyl)ethyltrimethoxysilane, ϒ-glycidoxypropylmethyldiethoxysilane, or the like; aminoalkylalkoxysilane such as ϒ-aminopropyltriethoxysilane, or the like; mercaptoalkylalkoxysilane such as ϒ-mercaptopropyltrimethoxysilane, or the like; halogenated alkylalkoxysilane such as ϒ-chloropropyltrimethoxysilane, or the like; vinylhalosilane such as vinyltrichlorosilane, or the like; and alkylacyloxysilane such as methyltriacetoxysilane, but are not limited thereto.

The binder may be included in an amount in a range of 0.05 to 5 parts by weight and specifically 0.3 to 2 parts by weight based on 100 parts by weight of the binder polymer. In one embodiment, within the above range, linking between the binder polymer and the organic particles is sufficient, and excellent heat resistance is provided.

The coating layer may be formed by applying a coating layer-forming composition including the organic particles and the binder polymer, and, optionally, the binder on the porous substrate.

The coating layer-forming composition may be prepared without limitation, and specifically the organic particles may be mixed with the binder polymer, and specifically an emulsion-type binder polymer, and dispersed, and the binder may be mixed and dispersed therein. In another embodiment, monomers for preparing the binder polymer are mixed with the binder and polymerized, and then the organic particles are mixed and dispersed therein.

The mixing and dispersing method is not particularly limited but may include, for example, kneading using a HENSCHEL-MIXER® and the like, or a method of agitating using an agitator when the binder polymer is an emulsion. HENSCHEL-MIXER® is registered trademark of Thyssen Henschel GmbH, Kassel, Germany.

One layer of the resulting coating layer may have a thickness of 0.1 µm to 5 µm. When the coating layer has a thickness within the thickness range, excellent heat resistance may be provided and a rechargeable lithium battery having high capacity may be provided.

The porous substrate may include at least one selected from a glass fiber, polyester, polyolefin, polytetrafluoroethylene (PTFE or, e.g., TEFLON®), and polyacrylonitrile. The porous substrate may be a single layer or a multilayer. Examples of the multilayer may include a polyethylene/polypropylene double-layered separator, a polyethylene/polypropylene/polyethylene triple-layered separator, a polypropylene/polyethylene/polypropylene triple-layered separator, and the like. In one embodiment, even a single layer may have excellent heat resistance.

The separator may have a predetermined (or preselected) desirable thickness depending on the capacity of the battery. For example, the separator may have a thickness in a range 10 to 30 μm. In one embodiment, when the separator has a thickness within the thickness range, heat resistance is improved and a rechargeable lithium battery having high capacity may be provided.

Hereinafter, a rechargeable lithium battery including the separator is described referring to the accompanying drawing.

The drawing is a schematic view of a rechargeable lithium battery according to one embodiment. The drawing depicts a cylindrical rechargeable lithium battery which is provided as an example.

Referring to the accompanying drawing, the rechargeable lithium battery 100 according to one embodiment includes an electrode assembly including a positive electrode 114, a negative electrode 112 facing the positive electrode 114, a separator 113 disposed between the positive electrode 114 and the negative electrode 112, and an electrolyte impregnating the positive electrode 114, the negative electrode 112, and the separator 113; a battery case 120 housing the electrode assembly; and a sealing member 140 sealing the battery case 120.

The negative electrode 112 includes a current collector and a negative active material layer disposed on the current collector.

The current collector may include a copper foil, a nickel foil, a stainless steel foil, a titanium foil, a nickel foam, a copper foam, a polymer substrate coated with a conductive metal, or a combination thereof, but it is not limited thereto.

The negative active material layer includes a negative active material, a binder, and optionally a conductive material.

The negative active material includes a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, or the like.

In one embodiment, the lithium metal alloy includes lithium and an element selected from the group consisting of Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, $SiO_x$ ($0<x<2$), a Si—C composite, a Si—Y alloy (wherein Y is selected from an alkali metal, an alkaline-earth metal, Group 13 to Group 16 elements, a transition element, a rare earth element, and a combination thereof, and not Si), Sn, $SnO_2$, a Sn—C composite, Sn—Y (wherein Y is selected from an alkali metal, an alkaline-earth metal, Group 13 to Group 16 elements, a transition element, a rare earth element, and a combination thereof, and not Sn), or the like. At least one of these materials may be mixed with $SiO_2$. The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

In an embodiment, the transition metal oxide includes vanadium oxide, lithium vanadium oxide, or the like.

The binder improves binding properties of negative active material particles with one another and with a current collector. Examples thereof may include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is used to improve conductivity of an electrode. Any suitable electrically conductive material may be used as a conductive material unless it causes a chemical change. Examples of the conductive material include a carbon-based material such as natural graphite, artificial graphite, carbon black, acetylene black, ketjen black, a carbon fiber, or the like; a metal-based material such as a metal powder or a metal fiber including copper, nickel, aluminum, silver, or the like; a conductive polymer such as a polyphenylene derivative; and mixtures thereof.

The negative electrode may be fabricated in a method of mixing the active material, a conductive material, and a binder to prepare an active material composition and coating the active material composition on a current collector, respectively.

The positive electrode 114 includes a current collector and a positive active material layer disposed on the current collector. The positive active material includes a positive active material, a binder and, optionally, a conductive material.

The current collector may include aluminum (Al) but it is not limited thereto.

The positive active material may include a compound that reversibly intercalates and deintercalates lithium (lithiated intercalation compound). Specifically, a composite oxide of at least one of cobalt, manganese, nickel, or a combination thereof, and lithium may be used, and examples may be compounds represented by the following formulae:

$Li_aA_{1-b}B_bD_2$ (wherein, in the above formula, $0.90 \le a \le 1.8$ and $0 \le b \le 0.5$); $Li_aE_{1-b}B_bO_{2-c}D_c$ (wherein, in the above formula, $0.90 \le a \le 1.8$, $0 \le b \le 0.5$, $0 \le c \le 0.05$); $LiE_{2-b}B_bO_{4-c}D_c$ (wherein, in the above formula, $0 \le b \le 0.5$, $0 \le c \le 0.05$); $Li_aNi_{1-b-c}Co_bB_cD_\alpha$ (wherein, in the above formula, $0.90 \le a \le 1.8$, $0 \le b \le 0.5$, $0 \le c \le 0.05$, $0 < \alpha \le 2$); $Li_aNi_{1-b-c}Co_bB_cO_{2-\alpha}F_\alpha$ (wherein, in the above formula, $0.90 \le a \le 1.8$, $0 \le b \le 0.5$, $0 \le c \le 0.05$, $0 < \alpha < 2$); $Li_aNi_{1-b-c}Co_bB_cO_{2-\alpha}F_2$ (wherein, in the above formula, $0.90 \le a \le 1.8$, $0 \le b \le 0.5$, $0 \le c \le 0.05$, $0 < \alpha < 2$); $Li_aNi_{1-b-c}Mn_bB_cD_\alpha$ (wherein, in the above formula, $0.90 \le a \le 1.8$, $0 \le b \le 0.5$, $0 \le c \le 0.05$, $0 < \alpha \le 2$); $Li_aNi_{1-b-c}Mn_bB_cO_{2-\alpha}F_\alpha$ (wherein, in the above formula, $0.90 \le a \le 1.8$, $0 \le b \le 0.5$, $0 \le c \le 0.05$, $0 < \alpha < 2$); $Li_aNi_{1-b-c}Mn_bB_cO_{2-\alpha}F_2$ (wherein, in the above formula, $0.90 \le a \le 1.8$, $0 \le b \le 0.5$, $0 \le c \le 0.05$, $0 < \alpha < 2$); $Li_aNi_bE_cG_dO_2$ (wherein, in the above formula, $0.90 \le a \le 1.8$, $0 \le b \le 0.9$, $0 \le c \le 0.5$, $0.001 \le d \le 0.1$); $Li_aNi_bCo_cMn_dG_eO_2$ (wherein, in the above formula, $0.90 \le a \le 1.8$, $0 \le b \le 0.9$, $0 \le c \le 0.5$, $0 \le d \le 0.5$, $0.001 \le e \le 0.1$); $Li_aNiG_bO_2$ (wherein, in the above formula, $0.90 \le a \le 1.8$, $0.001 \le b \le 0.1$); $Li_aCoG_bO_2$ (wherein, in the above formula, $0.90 \le a \le 1.8$, $0.001 \le b \le 0.1$); $Li_aMnG_bO_2$ (wherein, in the above formula, $0.90 \le a \le 1.8$, $0.001 \le b \le 0.1$); $Li_aMn_2G_bO_4$ (wherein, in the above formula, $0.90 \le a \le 1.8$, $0.001 \le b \le 0.1$); $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The compounds may have a coating layer on the surface, or may be mixed with another compound having a coating layer. The coating layer may include at least one coating element compound selected from the group consisting of an oxide of the coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any suitable coating method such as spray coating, dipping, or the like, but it is not illustrated in more detail since it is well-known to those who work in the related field.

The binder improves binding properties of the positive active material particles to each other and to the current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Any suitable electrically conductive material may be used as a conductive material unless it causes a chemical change. Examples of the conductive material include: one or more of natural graphite, artificial graphite, carbon black, acetylene black, ketjen black, a carbon fiber, copper, a metal powder or a metal fiber including nickel, aluminum, silver, and the like, and a polyphenylene derivative.

The positive electrode 114 may be fabricated by a method including mixing an active material, a conductive material, and a binder in a solvent to prepare an active material composition, and coating the composition on a current collector.

The electrode manufacturing method is well known, and thus is not described in more detail in the present specification. The solvent includes N-methylpyrrolidone, and the like, but it is not limited thereto.

The electrolyte includes a non-aqueous organic solvent and a lithium salt. The non-aqueous organic solvent plays a role of transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

Particularly, when a linear carbonate compound and a cyclic carbonate compound are mixed, a solvent having a high dielectric constant and a low viscosity may be provided. Herein, the cyclic carbonate compound and linear carbonate compound may be mixed in a volume ratio in a range of about 1:1 to 1:9.

The ester-based solvent may include, for example methylacetate, ethylacetate, n-propylacetate, dimethylacetate, methylpropionate, ethylpropionate, ɣ-butyrolactone, decanolide, valerolactone, mevalonolactone, caprolactone, and the like. The ether solvent may include, for example dibutylether, tetraglyme, diglyme, dimethoxyethane, 2-methyltetrahydrofuran, tetrahydrofuran, or the like, and the ketone-based solvent may include cyclohexanone, or the like. The alcohol-based solvent may include ethanol, isopropyl alcohol, or the like.

The non-aqueous organic solvent may be used singularly or in a mixture. When the organic solvent is used in a mixture, its mixture ratio can be controlled in accordance with desirable performance of the battery.

The non-aqueous organic solvent may further include an aromatic hydrocarbon-based organic solvent as well as the carbonate-based solvent. The carbonate-based solvent and the aromatic hydrocarbon-based organic solvent may be mixed in a volume ratio in a range of about 1:1 to about 30:1.

The aromatic hydrocarbon-based organic solvent may be an aromatic hydrocarbon-based compound represented by the following Chemical Formula 1.

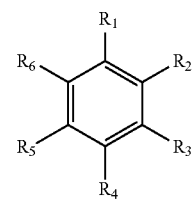

Chemical Formula 1

In Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound of the following Chemical Formula 2 in order to improve cycle-life of a battery Chemical Formula 2

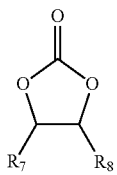

In Chemical Formula 2, $R_7$ and $R_8$ are each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound is further used, their use amounts may be controlled to improve cycle-life.

The lithium salt dissolved in an organic solvent supplies lithium ions in the battery, operates a basic operation of a rechargeable lithium battery, and improves lithium ion transport between positive and negative electrodes. Examples of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bis(oxalato)borate; LiBOB), or a combination thereof, which is used as a supporting electrolytic salt. The lithium salt may be used at a 0.1 to 2.0M concentration. When the lithium salt is included at the above concentration range, electrolyte performance and lithium ion mobility may be enhanced due to enhanced or desired electrolyte conductivity and viscosity.

The separator 113 separates a negative electrode 112 from a positive electrode 114 and provides a passage for lithium ions, which is the same as aforementioned.

The separator 113 separates a negative electrode 112 from a positive electrode 114 and provides a transporting passage for lithium ions, which is the same as described above. The separator has improved adherence due to the coating layer including the binder polymer. Particularly, the separator adheres to an electrode stably in a pouch battery using a flexible envelope such as a laminate film, and the like and thus gaps caused by detachment of the electrode and separator may be prevented (or reduced) and a position of the separator may be fixed.

The following examples illustrate the present invention in more detail. These examples, however, should not be interpreted as limiting the scope of the present invention.

Preparation of Binder Polymer

Preparation Example 1

After a nitrogen (inert) atmosphere was provided in a flask reactor having a condenser, a thermometer, a pipe for introducing a monomer emulsion, a pipe for introducing nitrogen gas, and an agitator; 60 parts by weight of distilled water and 1.5 parts by weight of sodium dodecylbenzene sulfonate were added thereto. Then, the temperature of the mixture was increased up to 80° C. Next, 2 parts by weight of styrene was added to the reactor, the mixture was agitated for 5 minutes, and 10 parts by weight of a 5% ammonium persulfate aqueous solution was added to the reactor to start a reaction. After one hour, a monomer emulsion including 30 parts by weight of 2-ethylhexylacrylate, 68 parts by weight of styrene, 2 parts by weight of acrylic acid, 0.5 parts by weight of sodium dodecylbenzenesulfonate salt, and 40 parts by weight of distilled water was added to the reactor for 3 hours in a dropwise fashion. Simultaneously or concurrently, 6 parts by weight of a 5% ammonium persulfate aqueous solution was added to the reactor in a dropwise fashion for 3 hours. After adding the monomer emulsion in a dropwise fashion, the mixture was additionally reacted for 2 hours and cooled down to 20° C., and the monomer remaining therein was removed under reduced pressure, obtaining a binder polymer emulsion. Binder polymer particles dispersed in the binder polymer emulsion had an average particle diameter of 150 nm. The average particle diameter was measured using nano GS (gas separation) and SEM (scanning electron microscope).

Preparation Example 2

After a nitrogen (inert) atmosphere was provided in a 10 L autoclave reactor, 60 parts by weight of distilled water and 1.5 parts by weight of sodium dodecylbenzenesulfonate salt were added thereto, and the temperature of the mixture was increased up to 70° C. Next, 2 parts by weight of styrene was added to the reactor, the mixture was agitated for 5 minutes, and 10 parts by weight of a 2% potassium persulfate aqueous solution was added to the reactor to start a reaction. After one hour, a monomer emulsion including 40 parts by weight of butadiene, 46 parts by weight of styrene, 10 parts by weight of methylmethacrylate, 3 parts by weight of itaconic acid, 1 parts by weight of hydroxyethylacrylate, 0.5 parts by weight of sodium dodecylbenzenesulfonate salt, and 40 parts by weight of distilled water was added to the reactor in a dropwise fashion for 4 hours. Simultaneously or concurrently, 10 parts by weight of a 2% potassium persulfate aqueous solution was added to the reactor for 3 hours. After adding the monomer emulsion, the mixture was additionally reacted for 3 hours and cooled down to 20° C., and the monomer remaining therein was removed under reduced pressure, thereby obtaining a binder polymer emulsion. Binder polymer particles dispersed in the binder polymer emulsion had an average particle diameter of 200 nm. The average particle diameter was measured using nano GS (gas separation) and SEM (scanning electron microscope).

Manufacture of Separator

Example 1

10 wt % of polyimide particulates as organic particles was added to 90 wt % of the binder polymer emulsion according to Preparation Example 1, and the mixture was agitated for 10 minutes. 0.2 parts by weight (100 parts by weight of the binder polymer) of γ-glycidoxypropyltrimethoxysilane as a binder was added to the agitated mixture, and the resulting mixture was agitated for 20 minutes, thereby preparing a coating layer-forming composition (or coating layer composition).

The coating layer-forming composition was gravure-printed on both sides of a 16 μm-thick polyethylene substrate, thereby fabricating a separator. The coating layer was 3 μm-thick on each side.

Example 2

A separator was fabricated according to the same method as Example 1 except for using 80 wt % of the binder polymer emulsion and 20 wt % of the polyimide particulates.

Example 3

A separator was fabricated according to the same method as Example 1 except for using 70 wt % of the binder polymer emulsion and 30 wt % of the polyimide particulates.

Example 4

A separator was fabricated according to the same method as Example 1 except for using the binder polymer emulsion according to Preparation Example 2.

Example 5

A separator was fabricated according to the same method as Example 4 except for using 80 wt % of the binder polymer emulsion and 20 wt % of the polyimide particulates.

Example 6

A separator was fabricated according to the same method as Example 4 except for using 70 wt % of the binder polymer emulsion and 30 wt % of the polyimide particulates.

Comparative Example 1

The binder polymer according to Preparation Example 1 (i.e., binder polymer without organic particles) was gravure-printed on both sides of a 16 μm-thick polyethylene substrate. The printed binder polymer was 3 μm thick on each side.

Comparative Example 2

A 16 μm-thick polyethylene separator was used.

Comparative Example 3

A separator was fabricated according to the same method as Example 1 except for using 40 wt % of the binder polymer emulsion and 60 wt % of the polyimide particulates.

Comparative Example 4

A separator was fabricated according to the same method as Example 1 except for using 30 wt % of the binder polymer emulsion and 70 wt % of the polyimide particulates.

Comparative Example 5

A separator was fabricated according to the same method as Example 4 except for using 40 wt % of the binder polymer emulsion and 60 wt % of the polyimide particulates.

Comparative Example 6

A separator was fabricated according to the same method as Example 4 except for using 30 wt % of the binder polymer emulsion and 70 wt % of the polyimide particulates.

Fabrication of Rechargeable Lithium Battery

LiCoO$_2$ as a positive active material, polyvinylidene fluoride (PVDF) as a binder, and carbon as a conductive agent were mixed in a weight ratio of 92:4:4, and the mixture was dispersed into N-methyl-2-pyrrolidone, thereby preparing a positive electrode active material slurry.

This slurry was coated on a 20 μm-thick aluminum foil and then, dried and compressed, thereby fabricating a positive electrode.

On the other hand, a negative electrode active material slurry was prepared by mixing artificial graphite as a negative electrode active material, styrene-butadiene a rubber as a binder, and carboxylmethyl cellulose as a thickener in a weight ratio of 96:2:2 and dispersing the mixture. This slurry was coated in a 15 μm-thick copper foil and then, dried and compressed, thereby fabricating a negative electrode.

The positive and negative electrodes according to Examples 1 to 6 and Comparative Examples 1 to 6 were respectively used to fabricate a pouch-type rechargeable lithium battery cell. Herein, an electrolyte solution was prepared by using a mixed solution EC (ethylene carbonate)/EMC (ethylmethyl carbonate)/DEC (diethyl carbonate) (3/5/2, volume ratio) including LiPF$_6$ in a concentration of 1.3 M.

Evaluation Example 1

Thermal Shrinkage Ratio Test

The separators according to Examples 1 to 6 and Comparative Examples 1 to 6 were heat-treated at 130° C. for 10 minutes in a convection oven and cooled down to room temperature and then, the thermal shrinkage ratio was measured. The results are provided in the following Table 1.

Evaluation Example 2

Evaluation of Charge and Discharge Characteristics

Each rechargeable lithium battery cell respectively including the separators according to Examples 1 to 6 and Comparative Examples 1 to 6 was constant current charged at 0.2 C of a current up to a voltage of 4.2 V at 25° C., constant voltage charged until a charge rate of 0.01 C was reached while the voltage was maintained at 4.2V, and constant current discharged at a constant current of 0.2 C to a voltage of 3.05V, thereby completing the formation process.

After the formation process, the rechargeable lithium battery cells were constant current charged at 0.5 C of a current up to a voltage of 4.2 V at 25° C. and constant voltage charged until a charge rate of 0.01 C was reached while the voltage was maintained at 4.2 V, and discharged at 0.5 C of a constant current to a voltage of 3.0 V, the cycle of which was 30 times repeated.

The results of the charge and discharge experiment, charge and discharge efficiency, and capacity retention are provided in the following Table 1. Herein, the charge and discharge efficiency was measured as a percentage of discharge capacity relative to charge capacity during the formation process, and the capacity retention was measured as a percentage of discharge capacity at the first cycle relative to discharge capacity at the 30th cycle.

TABLE 1

|  | Thermal shrinkage ratio | Charge and discharge efficiency | Capacity retention |
| --- | --- | --- | --- |
| Example 1 | ⊚ | ⊚ | ⊚ |
| Example 2 | ⊚ | ⊚ | ⊚ |
| Example 3 | ○ | ○ | ○ |

TABLE 1-continued

|  | Thermal shrinkage ratio | Charge and discharge efficiency | Capacity retention |
|---|---|---|---|
| Example 4 | ◎ | ○ | ◎ |
| Example 5 | ○ | ○ | ◎ |
| Example 6 | Δ | Δ | ○ |
| Comparative Example 1 | X | ○ | ○ |
| Comparative Example 2 | X | ○ | Δ |
| Comparative Example 3 | X | Δ | Δ |
| Comparative Example 4 | X | X | Δ |
| Comparative Example 5 | X | Δ | Δ |
| Comparative Example 6 | X | X | Δ |

Thermal Shrinkage Ratio:

◎: less than 5%, ○: greater than or equal to 5% and less than 10%, Δ: greater than or equal to 10% and less than 15%, x: greater than or equal to 15%

Charge and Discharge Efficiency:

◎: greater than or equal to 95%, ○: greater than or equal to 90% and less than 95%, Δ: greater than or equal to 85% and less than 90%, x: less than 85%

Capacity Retention:

◎: greater than or equal to 90%, ○: greater than or equal to 85% and less than 90%, Δ: greater than or equal to 80% and less than 85%, x: less than 80%

Referring to Table 1, the separators having a coating layer including organic particles and a binder polymer, which are included within the appropriate ranges, according to Examples 1 to 6 had a lower thermal shrinkage ratio than the ones according to Comparative Examples 1 to 6 and improved heat resistance, resultantly accomplishing a rechargeable lithium battery cell with excellent safety.

In addition, the separators according to Examples 1 to 6 had higher charge and discharge efficiency and capacity retention than the ones according to Comparative Examples 1 to 6, realizing excellent performance of a rechargeable lithium battery cell.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

| Description of symbols | |
|---|---|
| 100: rechargeable lithium battery | 112: negative electrode |
| 113: separator | 114: positive electrode |
| 120: battery case | 140: sealing member |

What is claimed is:

1. A separator for a rechargeable lithium battery, the separator comprising:
a porous substrate; and
a coating layer on one or more sides of the porous substrate, the coating layer comprising organic particles and a binder polymer, wherein the organic particles comprise an organic compound selected from the group consisting of acrylate-based compounds, derivatives of acrylate-based compounds, diallyl phthalate-based compounds, derivatives of diallyl phthalate-based compounds, polyimide-based compounds, derivatives of polyimide-based compounds, copolymers thereof, and mixtures thereof, the organic compound is different from that of the binder polymer, and the binder polymer is included in the coating layer in an amount in a range of 50 to 99 wt % based on the total weight of the coating layer,
wherein the binder polymer comprises a polymer polymerized from a monomer selected from the group consisting of ethylenic unsaturated carboxylic acid alkyl esters, nitrile-based compounds, conjugated diene-based compounds, ethylenic unsaturated carboxylic acids, salts of ethylenic unsaturated carboxylic acids, aromatic vinyl compounds, fluoroalkylvinylethers, vinylpyridines, non-conjugated diene-based compounds, α-olefins, ethylenic unsaturated amide compounds, sulfonic acid-based unsaturated compounds, and mixtures thereof,
wherein the porous substrate consists essentially of at least one selected from the group consisting of glass fiber, polyolefin, polytetrafluoroethylene (PTFE), and polyacrylonitrile, and
wherein the porous substrate is free of polyester.

2. The separator of claim 1, wherein the organic particles have an average particle diameter in a range of 1 nm to 1000 nm.

3. The separator of claim 1, wherein the organic particles are on the surface of the binder polymer.

4. The separator of claim 1, wherein the binder polymer further comprises another polymer polymerized from another monomer comprising a functional group selected from the group consisting of hydroxyl groups, glycidyl groups, amino groups, N-methylol groups, and vinyl groups.

5. The separator of claim 1, wherein the binder polymer is formed from an emulsion comprising binder polymer particles dispersed therein, and the binder polymer particles have an average particle diameter in a range of 0.01 μm to 0.5 μm.

6. The separator of claim 1, wherein the coating layer further comprises a binder comprising a silane-based compound, and the binder and the binder polymer are different.

7. The separator of claim 6, wherein the silane-based compound comprises a functional group selected from the group consisting of alkoxy groups, halogen groups, amino groups, vinyl groups, glycidoxy groups, and hydroxy groups.

8. The separator of claim 6, wherein the silane-based compound comprises one selected from the group consisting of vinyl alkylalkoxysilane, epoxyalkylalkoxysilane, aminoalkylalkoxysilane, mercaptoalkylalkoxysilane, halogenated alkylalkoxysilane, vinylhalosilane, and alkylacyloxysilane.

9. The separator of claim 6, wherein the binder is included in the coating layer in an amount in a range of 0.05 to 5 parts by weight based on 100 parts by weight of the binder polymer.

10. A lithium battery comprising:
a positive electrode;
a negative electrode facing the positive electrode;
a separator between the positive electrode and the negative electrode, the separator comprising:
a porous substrate and a coating layer on one or more sides of the porous substrate, the coating layer comprising organic particles and a binder polymer, wherein the organic particles comprise an organic compound selected from the group consisting of acrylate-based compounds, derivatives of acrylate-based compounds, diallyl phthalate-based compounds, derivatives of diallyl phthalate-based compounds, polyimide-based compounds, derivatives of polyimide-based compounds, copolymers thereof, and mixtures thereof, the organic compound is different from that of the binder polymer, and the binder polymer is included in the coating layer in an amount in a range of 50 to 99 wt % based on the total weight of the coating layer,
- wherein the binder polymer comprises a polymer polymerized from a monomer selected from the group consisting of ethylenic unsaturated carboxylic acid alkyl esters, nitrile-based compounds, conjugated diene-based compounds, ethylenic unsaturated carboxylic acids, salts of ethylenic unsaturated carboxylic acids, aromatic vinyl compounds, fluoroalkylvinylethers, vinylpyridines, non-conjugated diene-based compounds, α-olefins, ethylenic unsaturated amide compounds, sulfonic acid-based unsaturated compounds, and mixtures thereof,
- wherein the porous substrate consists essentially of at least one selected from the group consisting of glass fiber, polyolefin, polytetrafluoroethylene (PTFE), and polyacrylonitrile, and
- wherein the porous substrate is free of polyester; and
- an electrolyte solution impregnating the positive electrode, the negative electrode, and the separator.

11. The lithium battery of claim 10, the organic particles have an average particle diameter in a range of 1 nm to 1000 nm.

12. The lithium battery of claim 10, wherein the organic particles are on the surface of the binder polymer.

13. The lithium battery of claim 10, wherein the binder polymer further comprises another polymer polymerized from another monomer comprising a functional group selected from the group consisting of hydroxyl groups, glycidyl groups, amino groups, N-methylol groups, and vinyl groups.

14. The lithium battery of claim 10, wherein the binder polymer is formed from an emulsion comprising binder polymer particles dispersed therein, and the binder polymer particles have an average particle diameter in a range of 0.01 μm to 0.5 μm.

15. A separator for a rechargeable lithium battery, the separator comprising:
- a porous substrate; and
- a coating layer on one or more sides of the porous substrate, the coating layer comprising organic particles and a binder polymer, wherein the organic particles comprise an organic compound selected from the group consisting of diallyl phthalate-based compounds, derivatives of diallyl phthalate-based compounds, copolymers thereof, and mixtures thereof, the organic compound is different from that of the binder polymer, and the binder polymer is included in the coating layer in an amount in a range of 50 to 99 wt % based on the total weight of the coating layer,
- wherein the porous substrate comprises at least one selected from the group consisting of glass fiber, polyolefin, polytetrafluoroethylene (PTFE), and polyacrylonitrile, and
- wherein the porous substrate is free of polyester.

16. The separator of claim 1, wherein the binder polymer is included in the coating layer in an amount in a range of 80 to 99 wt % based on the total weight of the coating layer.

17. The separator of claim 10, wherein the binder polymer is included in the coating layer in an amount in a range of 80 to 99 wt % based on the total weight of the coating layer.

* * * * *